Sept. 22, 1959 W. J. FLEMING 2,905,796
CIRCUIT BREAKER FOR PLUG-IN PANELBOARD
Original Filed March 4, 1952 2 Sheets—Sheet 1
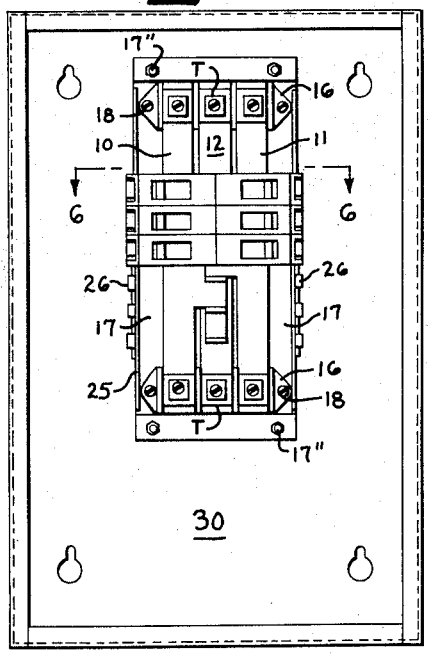
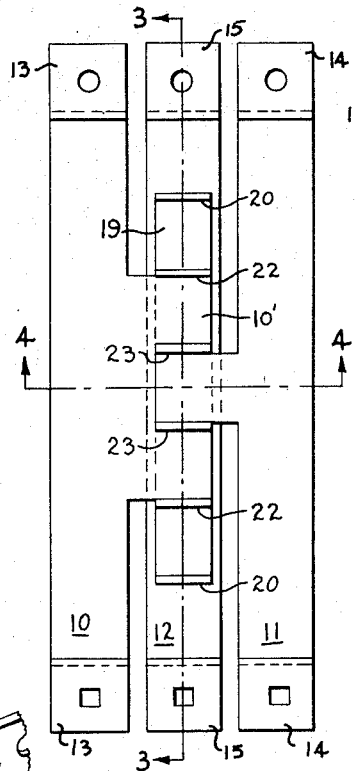
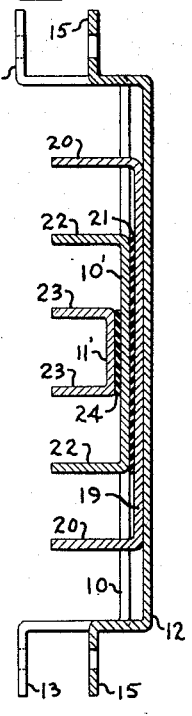
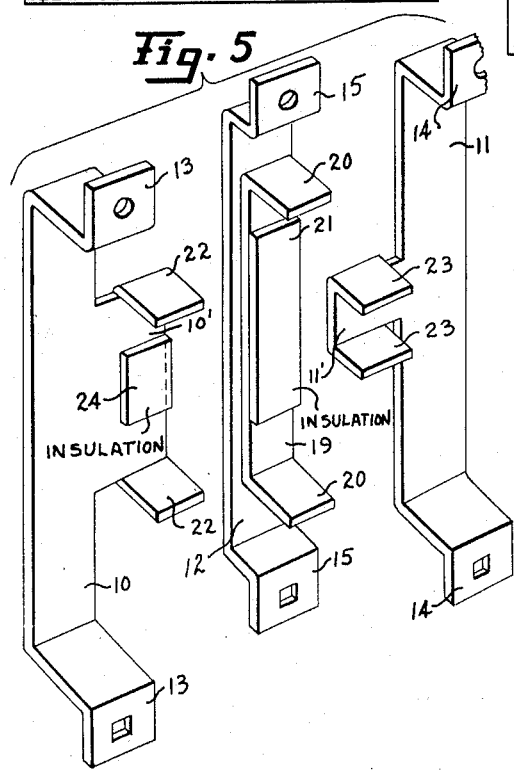
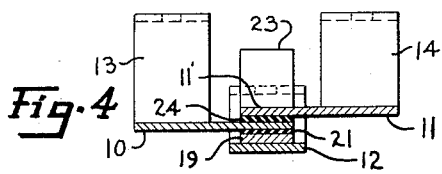
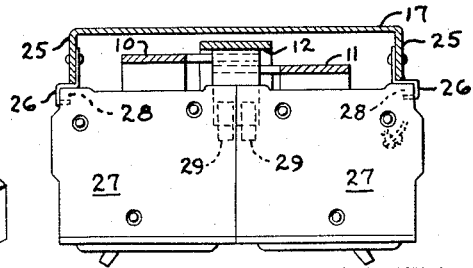
INVENTOR.
WILLIAM J. FLEMING
BY Martin Kelikau
ATTORNEY

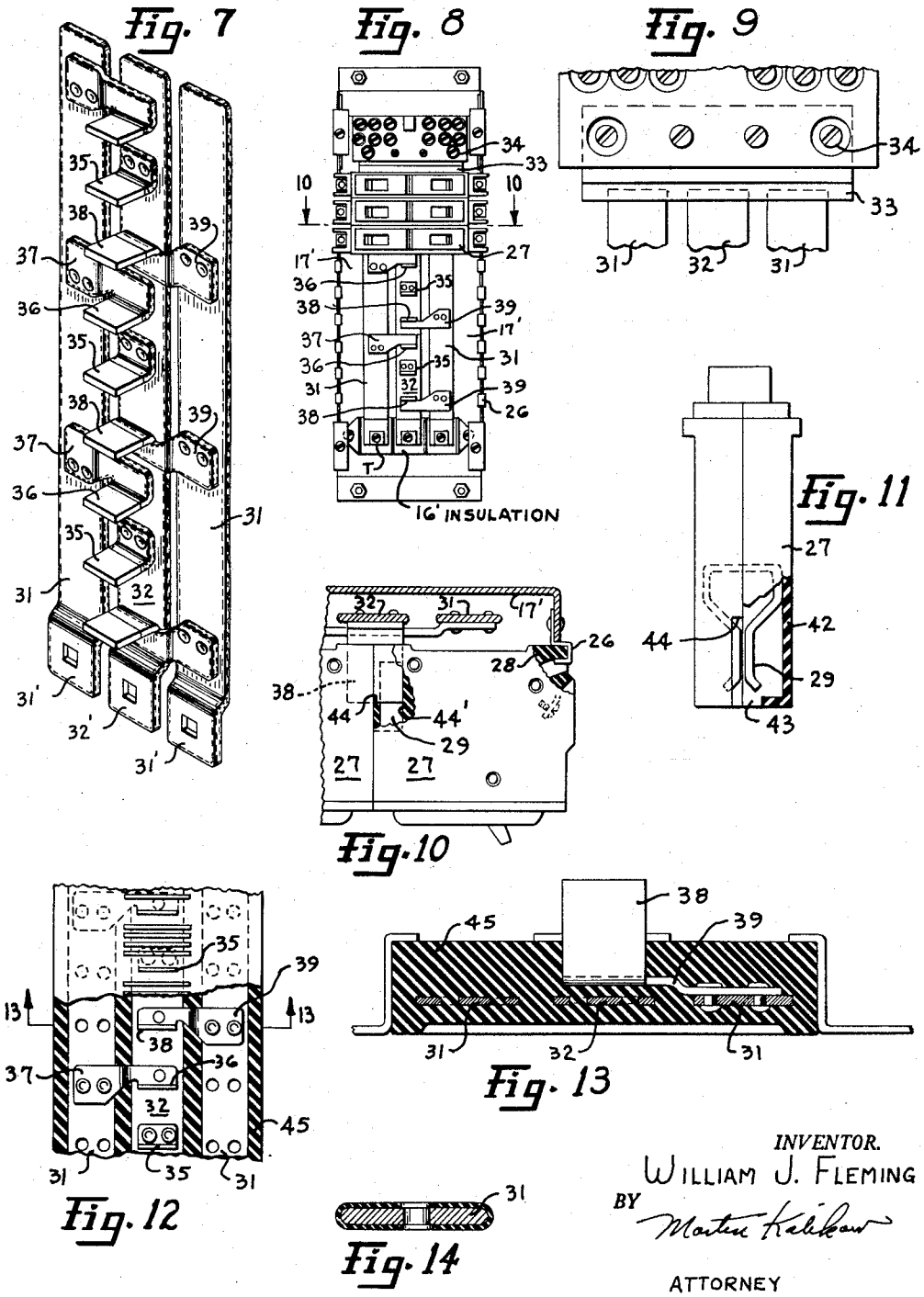

United States Patent Office 2,905,796
Patented Sept. 22, 1959

2,905,796

CIRCUIT BREAKER FOR PLUG-IN PANELBOARD

William J. Fleming, Winter Park, Fla., assignor to General Electric Company, a corporation of New York Original application March 4, 1952, Serial No. 274,749. Divided and this application October 25, 1955, Serial No. 542,748

8 Claims. (Cl. 200—168)

My invention relates to electric panelboards, load centers, and the like for use in electric lighting and power distribution systems, and more particularly to the mounting of circuit breakers on panelboards and the like.

This application is a division of my copending application Serial Number 274,749, issued March 13, 1956, as Patent 2,738,446, which application is a continuation-in-part of my application Serial Number 184,759 filed September 14, 1950, now abandoned, for Panelboard Construction.

Conventional panelboards comprise a suitable enclosure or cabinet in which is supported a plurality of supply bus bars in substantially parallel relation and a plurality of circuit breakers arranged in one or more rows and connected electrically to the bus bars by cross extending electrically conducting straps. The circuit breakers are secured in the panelboard by means of screws or bolts and the electric connections between the circuit breakers and the connecting straps likewise are made by means of screws. These steps in the assembly of the panelboard are obviously time consuming and require the use of tools.

Accordingly, an object of my invention is a more compact assembly of the bus bars and electric connections together with a more compact assembly of the circuit breakers themselves, and the provision of circuit breakers of smaller over-all size, whereby a substantial reduction in the size and cost of the panelboard is effected.

A further object of my invention is the provision of circuit breakers having readily detachable mounting means including electric circuit connection means of the plug-in type whereby the circuit breakers can be mounted quickly on and removed from the panelboard without the use of tools, the electric connections between the circuit breakers and the bus bars being made during the mounting operation.

In carrying out my invention in one form, I mount the bus bars in a try in closely spaced relation and arrange the circuit breakers in pairs with the circuit breakers of each pair extending in substantially abutting end-to-end relation crosswise of the bus bars and tray. The two circuit breakers of each pair are electrically connected to a single one of the bus bars.

For the electric connection of each pair of circuit breakers to one of the bus bars and also for the support of the abutting inner ends of the circuit breakers of each pair I provide a flat plug contact blade which extends transversely edgewise with respect to the bus bar and which is engaged by two spring terminal connectors mounted respectively on the inner abutting ends of the two circuit breakers. The contact blades for the group of bus bars are arranged to extend outward at right angles to the bus bars in flatwise alignment with each other in a column or row extending parallel with and centrally of the bus bars and tray. They are electrically connected in a predetermined order to the respective bus bars by rigid electrically conducting and supporting members, each blade being connected to a single bus bar, whereby the blades are supported by the bus bars. Each bus bar and the blade supporting members connected to it may be provided with a coating of electrically insulating material.

The support for the outer end of each circuit breaker comprises cooperating readily detachable mechanical connecting means on the outer end of the circuit breaker housing and the adjacent side of the tray, respectively. This connecting means for the outer end of the circuit breaker is arranged to be engaged when the circuit breaker is held with its inner end tilted outwardly away from its contact blade after which the breaker is swung about its outer end as a pivot to a mounted position in which its terminal connector engages substantially one half of the contact blade, the other half of the blade being engaged by the terminal connector of the abutting companion circuit breaker of the pair. It will thus be evident that the circuit breakers can be assembled very quickly on the tray, the electric connections to the bus bars being made at the same time. Contrawise a circuit breaker can be readily detached.

Figure 1 is a front view of a panelboard embodying one form of my invention located in a conventional wall box or cabinet with several circuit breakers in place.

Figure 2 is a front view of the bus bars and their contact blades on a larger scale.

Figure 3 is a longitudinal sectional view on the plane of the line 3—3 of Figure 2.

Figure 4 is a cross-sectional view on the plane of the line 4—4 of Figure 2.

Figure 5 is an exploded perspective view of the bus bars of Figures 1 to 4.

Figure 6 is a cross-sectional view of the panel support on the plane of the line 6—6 of Figure 1 and showing a pair of circuit breakers mounted in end-to-end relation.

Figure 7 is a perspective view showing a modified construction of bus bars and contact blades embodying my invention.

Figure 8 is a front view on a smaller scale showing such bus bars mounted in a tray for installation in a suitable housing or cabinet.

Figure 9 is an enlarged fragmentary view showing the support of Figure 8 for the upper ends of the bus bars.

Figure 10 is a view partly in section on the plane of the line 10—10 of Figure 8.

Figure 11 is an end view of the circuit breaker, parts being broken away.

Figure 12 is a fragmentary view partly in section showing a modification of the mounting of the bus bars.

Figure 13 is an enlarged transverse sectional view, the section being taken on the plane of the line 13—13 of Figure 12.

Figure 14 is an enlarged sectional view of a perforated bus bar showing a coating of insulating material.

In the construction shown in Figures 1 to 6 of the drawing two bus bars 10 and 11 are mounted parallel to each other and between these side bus bars is located a central parallel bar 12. The bus bars are provided with offset terminal extensions on each end such as 13, 14 and 15. Each bus bar is supported at each end by a transverse insulating block 16 to which the extensions 13, 14 and 15 are secured and the blocks are supported in the tray 17 by means of screws 18 with the bus bar 12 extending centrally of the tray. The bus bars are provided with suitable line wiring terminals T at either or both ends.

The central bus bar 12 carries an electrically conducting bar 19 which is bent at the ends to form contact blades 20, 20 extending crosswise of the bus bar and at right angles to the plane of the bus bar which blades are adapted to receive and support plug-in circuit breakers. The bus bar 10 has an integral extension 10' which overlies the insulating piece 21 on the central bar. The contact blades 22, 22 project from the extension 10' and when the bus bars are assembled extend parallel to the contact blades 20, 20. The bus bar 11 has an extension 11' which is insulated from the extension 10' by an insulating member 24. The contact blades 23, 23 are bent upwardly from the extension 11' in line with and parallel to blades 20 and 22. It will be observed that the bar 19 and bus bar extensions 10' and 11' form rigid electrically conducting supporting members for supporting the contact blades on the bus bars.

As shown in the drawing the blades 20, 22 and 23 extend edgewise in transverse relation with the bus bars and are arranged in flatwise alignment in a single column or row opposite the central bus bar 12 and extending centrally of the tray 17. The tray 17 has side walls or flanges 25, 25 provided on their edges with spaced hook-like members 26, constituting detachable pivotal circuit breaker supporting means, there being a hook member 26 opposite each edge of each blade.

As shown in Figure 6, the manually operated circuit breakers 27, 27 are mounted in pairs with the circuit breakers of each pair extending in end-to-end abutting relation crosswise of the bus bars. Each breaker is provided on its outer lower end corner with a lug 28 formed on the insulating housing of the circuit breaker, which lug detachably interlocks with a hook member 26 whereby the outer ends of the circuit breakers are hingedly supported on the side walls of the tray 17. On their opposite abutting inner ends the circuit breakers are provided each with a plug connector terminal 29 in the form of spring jaws which grasp and frictionally engage substantially one-half portions of the contact blade positioned between the two hooks 26.

It will be observed that each contact blade thus constitutes a pair of plug-contact means and serves as an electric connection between its two circuit breakers and one of the bus bars, as well as a support for the inner adjacent ends of the two circuit breakers. This arrangement of a single electric contact and supporting blade for each pair of circuit breakers provides for a very compact and low-cost assembly of the circuit breakers and bus bars and tray with the bus bars in closely spaced relation whereby circuit breakers of smaller size can be used. The circuit breakers are provided with a mechanism (not shown) of any suitable type and having a plug terminal 29 at one end, one suitable form of breaker mechanism being disclosed in the Getchell Patent 2,455,753.

In mounting a circuit breaker on the supporting tray the circuit breaker is held in a tilted position, i.e. with the inner end tilted downward as viewed in Figure 10 in spaced relation with the contact blade, and the lug 28 is inserted in the hook 26, a sufficiently loose fit being provided so that the lug slips freely into the hook with the circuit breaker held in this position. The circuit breaker is then swung in the plane of its cooperating contact blade and about the hook 26 as a pivot from the tilted position to the final position shown in Figure 6, its contact jaws 29 being forced onto the blade. It will be observed that the two hooks 26 mounting the outer ends of a pair of circuit breakers are spaced apart a distance just sufficient to accommodate two circuit breakers, the contact blade being midway between the hooks, and therefore substantially abutting engagement of the two inner ends of the circuit breakers is assured.

As shown in Figure 1, adjacent contact blades are spaced apart a distance approximately equal to the width of a circuit breaker so that the circuit breakers are mounted in compact substantially side-by-side engagement. The assembly of the tray, bus bars and circuit breakers is preferably mounted by screws 17" in a suitable type of box or cabinet 30 having a suitable front or trim plate (not shown) which still further secures the circuit breakers in place and a door (not shown) if desired. Any breaker unit may be easily mounted or removed independently of all others.

The pivotal mounting of the outer ends of the circuit breakers greatly facilitate the separate removal of a single circuit breaker from a solid row of circuit breakers because such a breaker cannot be grasped at its sides or ends to pull it straight out, but it can easily be pivoted from between the adjacent circuit breakers by grasping the handle and the outer end. After it has been disengaged from the contact blade, it is freely removable.

In the form shown in Figures 7 to 10 inclusive and 14, the bus bars 31, 31, 32 are arranged in a substantially common plane and supported at their ends, the upper ends of the bus bars being supported in an insulating block 33 which is provided with a groove into which the ends of the bus bars extend and which is secured in the tray 17' by one or more screws or bolts 34. The offset terminal lower ends 31', 31', 32' of the bus bars are supported on a transverse insulating block 16' which is secured in the tray 17', such as previously described. The tray is provided with lateral hook-like members 26, each of which engages a lug 28 on a manually operated circuit breaker 27, as shown in Figure 10. Each bus bar is provided with a circuit terminal T.

In this case, the center bus bar 32 is provided with contact blades 35, 35 whose feet are riveted or welded to the bus bar 32 whereby the blades are supported by the bus bar. One bus bar 31 is provided with a number of contact blades 36, 36 which are provided with rigid electrically conducting transverse supporting extensions 37, 37 which are riveted or welded to the bus bar 31 and so constructed that the base of each blade is spaced away from the center bus bar 32. Similarly the other bus bar 31 is provided with projecting contact blades 38, 38 mounted on transverse supporting extensions 39, 39. The base of each of these blades 38, 38 is spaced away from the center bus bar 32.

As shown in Figure 8, the bus bars are mounted in the tray in closely spaced relation with the contact blades in a column or row extending centrally of the tray, the contact blades being in flatwise alignment with each other and extending edgewise in transverse relation with the bus bars.

The circuit breakers 27 in the form shown in Figures 7 to 11 inclusive are mounted on the tray in the same manner as disclosed in Figures 1 to 6 inclusive. In other words, the circuit breaker is first held in a tilted position with respect to the tray and its lug 28 inserted in the selected hook 26 and then the opposite end of the circuit breaker, provided with the plug contact jaws 29, is swung about the hook 26 as a pivot into engagement with the opposite contact blade and then forced onto the contact blade with the jaws frictionally grasping the blade. As shown in Figures 10 and 11 the plug-contact jaws 29, forming one terminal of the circuit breaker, are mounted inside of the insulating housing 42 of the circuit breaker and the housing is provided with a slot 43 in its lower wall and inner or front wall, i.e. in a lower inner end corner as viewed in Figure 11 to receive substantially one-half of the contact blade, the contact jaws being positioned in the slot. As shown in Figure 10 the circuit breaker is pressed onto the contact blade until the end of the blade engages the upper edge or wall 44 of the slot.

Moreover, the endwise position of the circuit breaker is determined and adjusted when necessary when the circuit breaker is being pressed onto the contact blade by engagement of the rearward wall 44' of the slot with the side edge of the contact blade adjacent the hook 26, so as to shift the circuit breaker endwise farther into the hook. This endwise positioning of the circuit breaker when necessary in case the lug has not been completely inserted in the hook assures that the circuit breaker will cover no more than one half of the contact blade and consequently leave sufficient space for the other circuit breaker of the pair. It will be observed that because of the pivotal movement of the breaker, the jaws 29 are forced on the contact blade with a combined longitudinal and transverse movement with respect to the contact blade.

It will be observed that the final position of the circuit breaker is definitely fixed by the hook 26 at one end and by engagement of the housing with the blade at the other end. These limiting positions are such that the two circuit breakers of a pair as shown in Figure 10 when in mounted position are in end-to-end alignment with their adjacent inner ends in substantially abutting engagement, since the two hooks on opposite sides of a contact blade are spaced apart, as shown in the drawing, a distance substantially equal to twice the length of a single circuit breaker with the contact blade midway between them.

Usually in a given panelboard construction, three bus bars are provided for connection respectively to the three conductors of a three-phase grounded neutral electric supply source and with at least two contact blades attached to each bus bar. One of the blades on one of the bus bars will be located near its terminal, such as lower blade 38 on the bus bar 31, the next successive blade 35 will be attached to the next bus bar 32, and the third successive blade 36 will be attached to the third bus bar 31. The second blade attached to the first bus bar will be spaced from the third blade, and so on in phase sequence as shown in Figure 7.

In the form shown in Figures 12 and 13 the bus bars are embedded in a resilient, solidified, molded insulating body 45 made of a vinyl resin or plastisol composition to form a rugged unitary assembly as described and claimed in a copending application Serial Number 273,473 filed February 26, 1952, now Patent Number 2,738,445, by Herman J. Hammerly, Robert T. Casey and Wilfred H. Yeamans, assigned to the same assignee as this application.

While I have described only certain preferred embodiments of the invention by way of illustration, many modifications will occur to those skilled in the art and I therefore wish to have it understood that I intend in the appended claims to cover all such modifications as fall within the true spirit and scope of the invention.

What I claim as new and desire to secure by Letters Patent of the United States is:

1. For use in a panelboard or the like having a plurality of spaced contact blades, a circuit breaker comprising a generally rectangular insulating casing having opposed end walls and opposed side walls, a plug-in socket-type electrical connector within said casing adjacent one of said end walls and having contact jaws adapted to receive one of said contact blades therebetween in frictionally retained engagement, a hook-on type mounting lug integral with said casing adjacent said end wall opposite from said one end wall for mounting said circuit breaker by pivotal movement about said mounting lug in a plane parallel to said side walls, said contact jaws having their major contacting surfaces extending generally parallel to said side walls.

2. For use in a panelboard or the like having a plurality of spaced contact blades, a circuit breaker comprising a generally rectangular insulating casing having opposed front and rear walls, opposed side walls and opposed end walls, a plug-in socket-type electrical connector within said casing substantially midway between said side walls adjacent said rear wall and one end wall, said connector having contact jaws adapted to receive one of said contact blades therebetween in frictional engagement therewith, said contact jaws having their major contacting surfaces extending generally parallel to said side walls, and said rear wall having an opening therein providing access to said contact jaws, whereby said opposed side walls are adapted to serve as insulating barriers for said contact jaws, a hook-on type mounting lug carried by said casing adjacent the other of said end walls for mounting said circuit breaker by pivotal movement about said mounting lug in a plane parallel to said side walls.

3. A circuit breaker as set forth in claim 2 wherein said one end wall adjacent said connector has an opening therein providing access to said contact jaws, said openings in said rear and end walls being aligned and continuous to form a corner slot in said casing, whereby two of said breakers may be mounted on one of said spaced contact blades.

4. For use in a panelboard or the like having a plurality of spaced contact blades, a circuit breaker comprising a generally rectangular insulating casing having opposed end walls, opposed side walls and opposed front and rear walls, a plug-in socket-type electrical connector within said casing substantially midway between said side walls adjacent said rear wall and one end wall, said connector comprising a generally U-shaped member having closely spaced resiliently supported side portions comprising contact jaws adapted to receive one of said contact blades therebetween in frictional engagement therewith, said contact jaws having their major contacting surfaces extending generally parallel to said side walls, said back and end walls having contiguous openings therein providing access to said contact jaws and said insulating casing having mounting means adjacent said end wall remote from said plug-in connector for mounting said circuit breaker by pivotal movement about said mounting means in a plane parallel to said side walls.

5. For use in a panelboard or the like having at least one pair of closely spaced discrete plug-in type electrical connectors of differing electrical potential, said electrical connectors having their major contacting surfaces extending in broadside parallel relation each to the other, a circuit breaker comprising a generally rectangular insulating casing having opposed end walls and opposed side walls, a plug-in type electrical connector carried by said casing adjacent one of said end walls and adapted to engage one of said spaced plug-in electrical connectors of said panelboard in frictionally retained engagement, a mounting lug integral with said casing between the planes of said opposed side walls and adjacent said end wall opposite from said one end wall, said plug-in type electrical connector of said breaker having its major contacting surfaces extending generally parallel to said side walls and positioned entirely within the space defined by the planes of said opposed side and end walls.

6. An electric circuit breaker comprising a generally rectangular insulating casing having opposed side walls, opposed end walls, and opposed front and back walls, a manually engageable handle projecting from said front wall, a hook-on type mounting lug on said casing at one back corner, a plug-in electrical connector at the opposite back corner, said connector being supported in said casing adjacent its upper end and having a pair of generally planar contact portions extending downwardly from its supported upper end in closely spaced flatwise parallel relation and movable toward and away from each other, said contact portions being exposed for connection from directions perpendicular to said back and end walls, the major planar surfaces of said contact portions extending generally parallel to the planes of said side walls whereby pivotal movement of said breaker about said lug moves said surfaces in a direction parallel to the planes of said contact portions.

7. For use in a panelboard or the like having a row of plug-in type electrical connectors each including a pair of opposed contact surfaces and at least one row of circuit breaker retaining hook elements parallel to and spaced away from said row of electrical connectors, a circuit breaker comprising a generally rectangular insulating casing having opposed end walls, opposed side walls and opposed front and back walls, a manually engageable handle projecting from said front wall, a mounting lug at one lower corner between the planes of said side walls for releasable engagement with one of said retaining elements, and a plug-in type electrical connector carried by said casing adjacent the opposite lower corner thereof and having contact portions exposed for contact within the space defined by the planes of said walls of said casing, said casing comprising two substantially equal portions having a meeting plane parallel to and substantially midway between said side portions, said contact portions comprising a pair of generally planar contact members extending in closely spaced flatwise parallel relation and resiliently movable in a direction transverse to their major planar surfaces to provide contact pressure upon engagement with said pair of contact surfaces of said panelboard connectors, said major planar surfaces of said members extending adjacent and generally parallel to said meeting plane of said casing and parallel to the direction of movement of said breaker when pivoted about said mounting lug.

8. For use with a panelboard or the like having a panelboard connector and a retaining hook element aligned with and spaced from said panelboard connector to establish a circuit breaker mounting location therebetween wherein the breaker is in engagement with said retaining element at one end and overlies only a predetermined portion of said panelboard connector at the other, an electric circuit breaker comprising a generally rectangular insulating casing having opposed end walls, opposed side walls, and opposed front and back walls, a manually engageable handle projecting from said front wall, and a plug-in type electrical connector for connection with said panelboard connector carried by said casing adjacent one end wall thereof and within the space defined by the planes of the walls of said casing, a hook-on type mounting lug on said casing between said side walls and adjacent the other end wall for engagement with said retaining hook element for mounting said breaker by pivotal movement thereabout in a direction toward said back wall, said back wall and said one end wall having discontinuous portions thereof adjacent said plug-in connector to expose portions of said plug-in connector for plug-in engagement with said predetermined portion of said panelboard connector during said pivotal mounting movement while permitting a remaining adjacent portion of said panelboard connector to extend beyond said one end wall, and said plug-in type connector having its major contacting surfaces extending in a plane parallel to said side walls of said casing whereby said pivotal mounting movement of said breaker about said mounting lug moves said contacting surfaces into engagement with said panelboard connector by movement parallel to said contact surfaces.

References Cited in the file of this patent

UNITED STATES PATENTS

| | | |
|---|---|---|
| 1,635,041 | Harper | July 5, 1927 |
| 1,669,626 | Ordway | May 5, 1928 |
| 2,079,866 | Mayer | May 11, 1937 |
| 2,124,269 | Anderson et al. | July 19, 1938 |
| 2,161,571 | Harvey | June 6, 1939 |
| 2,186,640 | Jirka et al. | Jan. 9, 1940 |
| 2,229,842 | Frank et al. | Jan. 28, 1941 |
| 2,318,861 | Huguelet | May 11, 1943 |
| 2,424,909 | Adam et al. | July 29, 1947 |
| 2,490,514 | Favre | Dec. 6, 1949 |
| 2,530,548 | Stanley | Nov. 21, 1950 |
| 2,601,147 | Jackson | June 17, 1952 |
| 2,627,563 | Thomas | Feb. 3, 1953 |
| 2,647,225 | Cole et al. | July 28, 1953 |